(12) United States Patent
Freshour (10) Patent No.: US 10,465,740 B2
(45) Date of Patent: Nov. 5, 2019

(54) NUT RETENTION SYSTEM

(71) Applicant: Goodrich Corporation, Charlotte, NC (US)

(72) Inventor: Thomas Freshour, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 267 days.

(21) Appl. No.: 15/354,676

(22) Filed: Nov. 17, 2016

(65) Prior Publication Data

US 2018/0135686 A1    May 17, 2018

(51) Int. Cl.
| | | |
|---|---|---|
| *F16B 39/28* | (2006.01) | |
| *B64C 25/42* | (2006.01) | |
| *B64C 25/34* | (2006.01) | |
| *F16B 39/10* | (2006.01) | |

(52) U.S. Cl.
CPC .............. *F16B 39/28* (2013.01); *B64C 25/34* (2013.01); *B64C 25/42* (2013.01); *F16B 39/101* (2013.01)

(58) Field of Classification Search
CPC ........ F16B 39/28; F16B 39/101; B64C 25/42; B64C 25/34
See application file for complete search history.

(56) References Cited

U.S. PATENT DOCUMENTS

| | | | |
|---|---|---|---|
| 1,544,627 | A | 7/1925 | Bateman |
| 1,915,088 | A | 6/1933 | Eastburg |
| 3,620,574 | A | 11/1971 | Cox et al. |
| 5,116,178 | A | 5/1992 | Lerman et al. |
| 5,489,174 | A | 2/1996 | Lesson |
| 5,951,222 | A | 9/1999 | Gosling |
| 2007/0031207 | A1 | 2/2007 | Rosenbaum |
| 2015/0367488 | A1 | 12/2015 | Koehler |

FOREIGN PATENT DOCUMENTS

| | | |
|---|---|---|
| WO | 2010037547 | 4/2010 |
| WO | 2010085030 | 7/2010 |

OTHER PUBLICATIONS

European Patent Office, European Search Report dated Mar. 19, 2018 in Application No. 17202173.5-1010.

*Primary Examiner* — John C Hong
(74) *Attorney, Agent, or Firm* — Snell & Wilmer, L.L.P.

(57) ABSTRACT

A nut retention arrangement may comprise a first nut comprising a first threaded aperture and a first retention aperture, a second nut comprising a second threaded aperture and a second retention aperture, and a tensile member having a first end extending through the first retention aperture and a second end extending through the second retention aperture such that rotation in a direction toward loosening of either the first nut or the second nut causes rotation in a direction toward tightening of the other of the first nut or the second nut.

17 Claims, 7 Drawing Sheets

NUT RETENTION SYSTEM

FIELD

The present disclosure relates generally to the field of fasteners, and more specifically to systems and methods for fastener retention.

BACKGROUND

Many systems are subject to vibration, which may cause the loosening of threaded fasteners in the system. Threaded fasteners, such as a bolt and nut, are typically pretensioned by axially rotating the nut relative to the bolt to a predetermined torque. Friction between the nut and bolt may aid in preventing the nut from rotating loose from the bolt. In many applications, such as aircraft wheels, a loosened fastener can cause undesirable damage to the system.

SUMMARY

In various embodiments, a nut retention arrangement is disclosed herein. A nut retention arrangement may comprise a first nut comprising a first threaded aperture and a first retention aperture, a second nut comprising a second threaded aperture and a second retention aperture, and a tensile member having a first end extending through the first retention aperture and a second end extending through the second retention aperture such that rotation in a direction toward loosening of either the first nut or the second nut causes rotation in a direction toward tightening of the other of the first nut or the second nut.

In various embodiments, the nut retention arrangement may further comprise a first threaded fastener, and a second threaded fastener, wherein the first nut is coupled to the first threaded fastener, the first threaded aperture engaging the first threaded fastener, and the second nut is coupled to the second threaded fastener, the second threaded aperture engaging the second threaded fastener. The tensile member may prevent the first nut from rotating with respect to the first threaded fastener and prevents the second nut from rotating with respect to the second threaded fastener. The nut retention arrangement may further comprise a first ferrule coupled to the first end and a second ferrule coupled to the second end. The first ferrule may prevent the first end from translating through the first retention aperture. The first nut may comprise an annular wall defining the first threaded aperture, the annular wall extends along a rotational axis of the first nut, and a flange circumferentially disposed about the annular wall. The first retention aperture may extend through the flange. The first retention aperture may extend in a direction orthogonal to the rotational axis of the first nut. The tensile member may comprise a first strand twisted together with a second strand, wherein the first strand extends through the first retention aperture, and one of the first strand or the second strand extends through the second retention aperture. The first end of the tensile member may terminate with the first strand twisted together with the second strand. The second end of the wire may terminate with the first strand coupled to the second strand at a bend in the tensile member.

In various embodiments, a method of servicing an aircraft to prevent threaded fasteners from loosening is disclosed herein. A method of servicing an aircraft to prevent threaded fasteners from loosening may comprise replacing a first threaded fastener on an aircraft with a first anti-loosening nut, replacing a second threaded fastener on the aircraft with a second anti-loosening nut, and connecting a tensile member between the first anti-loosening nut and the second anti-loosening nut such that rotation in a direction toward loosening of either the first anti-loosening nut or the second anti-loosening nut causes rotation in a direction toward tightening of the other of the first anti-loosening nut or the second anti-loosening nut.

In various embodiments, the tensile member may comprise at least one of a wire or a cable.

In various embodiments, a nut is disclosed herein. A nut may comprise an annular wall defining a threaded aperture extending along a rotational axis of the nut, the annular wall configured to engage a threaded fastener via the threaded aperture, a flange circumferentially disposed about the annular wall, and a first retention aperture disposed in the flange.

In various embodiments, the first retention aperture may extend in a direction perpendicular to the rotational axis. The first retention aperture may be configured to receive a tensile member. The first retention aperture may extend through the flange without breaching the threaded aperture. The nut may further comprise a second retention aperture disposed in the flange. The first retention aperture and the second retention aperture may be circumferentially spaced about the flange. The flange may extend from the annular wall at a terminus of the nut.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

For example, in the context of the present disclosure, systems and methods may find particular use in connection with aircraft wheel and brake systems. However, various aspects of the disclosed embodiments may be adapted for optimized performance with a variety of components and in a variety of systems. As such, numerous applications of the present disclosure may be realized.

Figure 1:
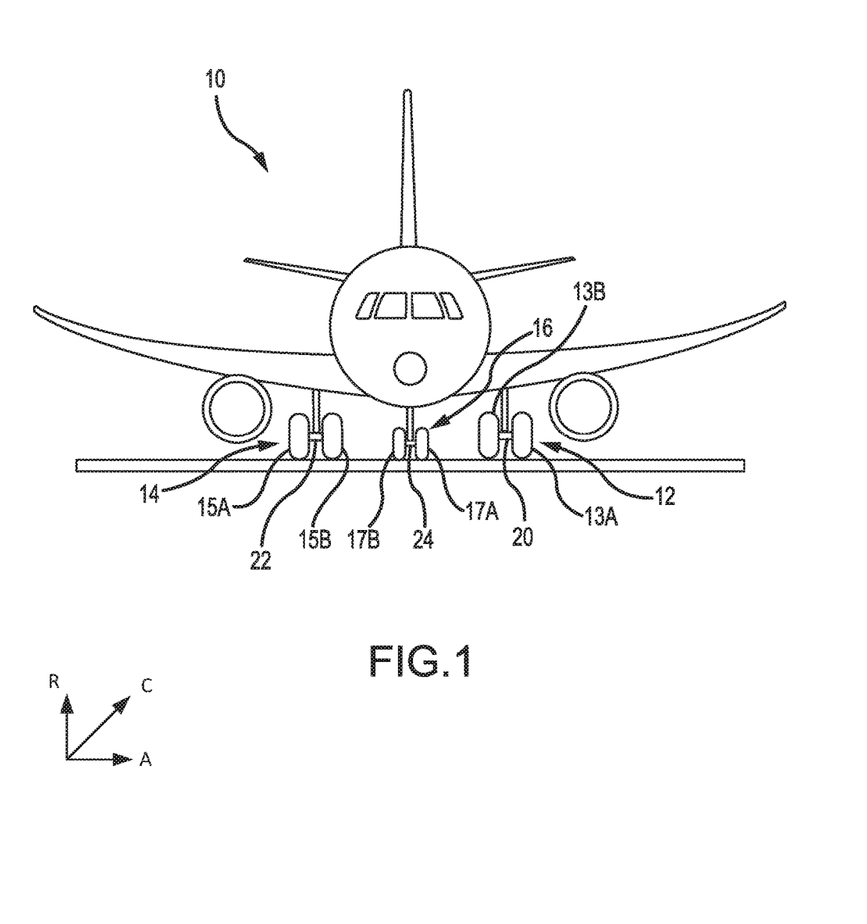
FIG. 1 illustrates an aircraft having landing gear, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by an axle 20. Landing gear 14 may include wheel 15A and wheel 15B coupled by an axle 22. Landing gear 16 may include nose wheel 17A and nose wheel 17B coupled by an axle 24. The nose wheels differ from the main wheels in that the nose wheels may not include a brake and/or a wheel speed transducer. An A-R-C axis is used throughout the drawings to illustrate the axial (A), radial (R) and circumferential (C) directions relative to wheel 15A.

Figure 2:
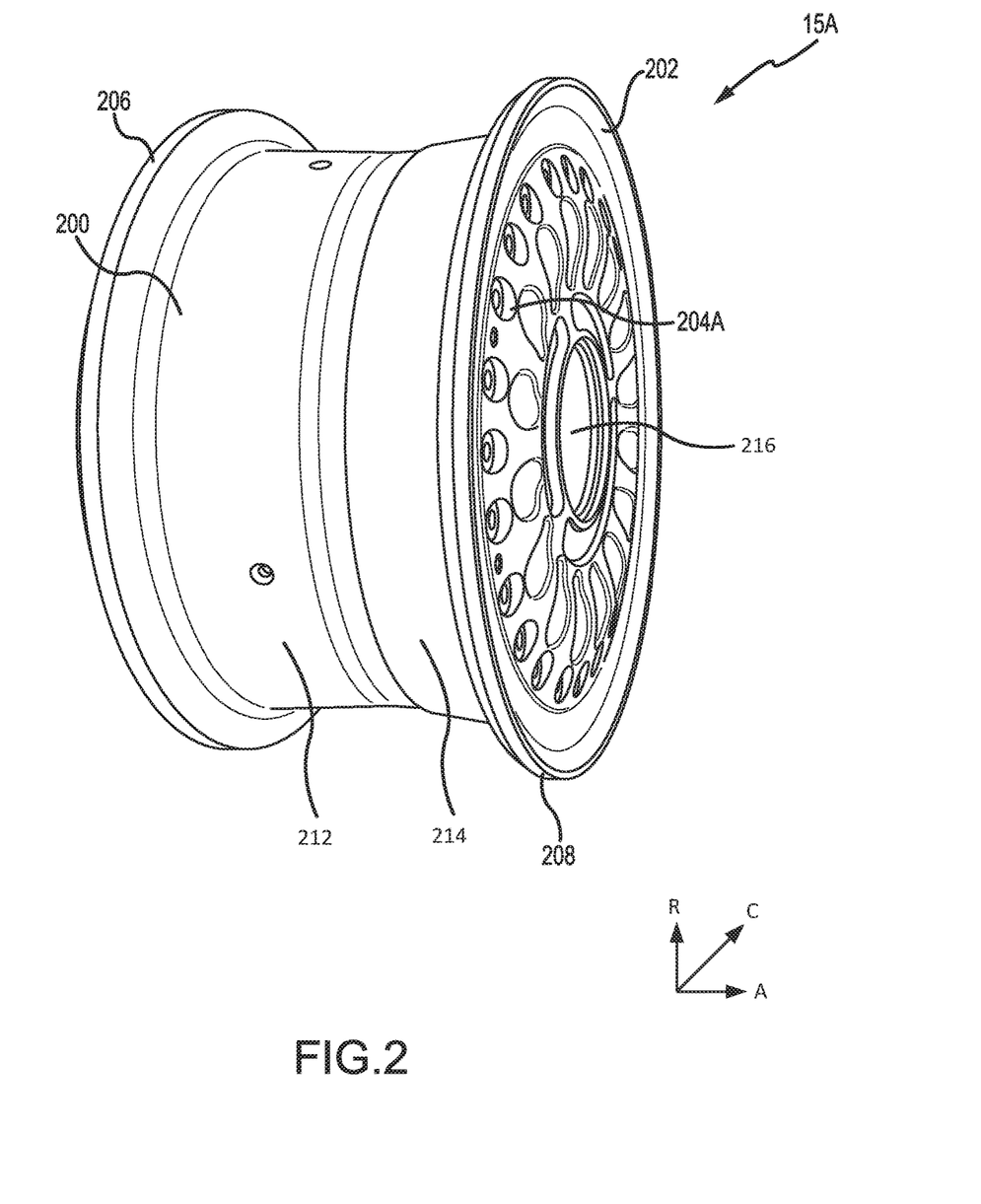
FIG. 2 illustrates a perspective view of an aircraft wheel, in accordance with various embodiments.

With reference now to FIG. 2, wheel 15A in accordance with various embodiments includes an inner wheel half 200 and an outer wheel half 202. Outer wheel half 202 defines a plurality of outer bolt apertures including outer bolt aperture 204A which is designed to receive bolts for securing inner wheel half 200 to outer wheel half 202.

Inner wheel half 200 includes a first outer surface 212 that defines a first flange 206 at an outer axial end of inner wheel half 200. Similarly, outer wheel half 202 includes a second outer surface 214 that defines a second flange 208 on an outer axial end of outer wheel half 202. Outer wheel half 202 includes a bearing bore 216 which may house at least one bearing system.

Figure 3:
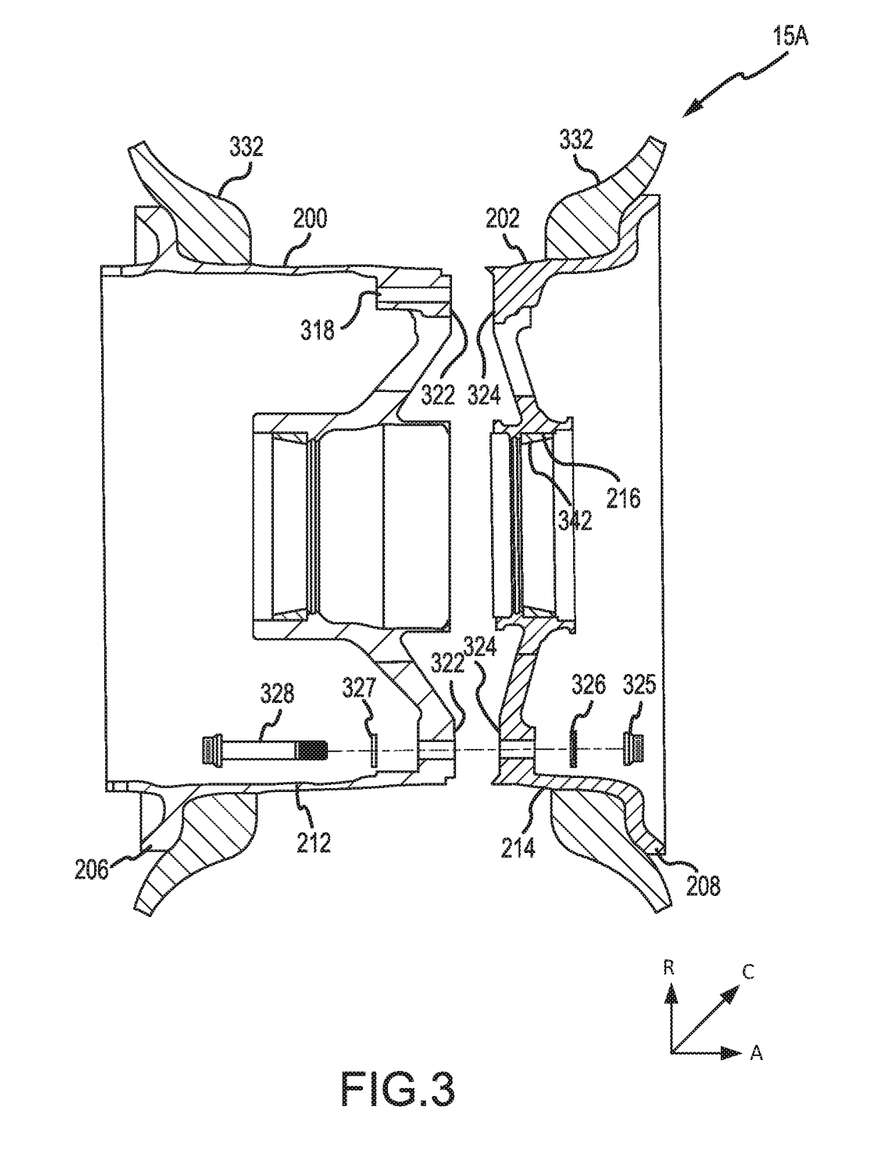
FIG. 3 illustrates a cross-section view of an aircraft wheel, in accordance with various embodiments.

With reference to FIG. 3, in accordance with various embodiments, inner surface 322 of inner wheel half 200 is positioned adjacent to a mating surface 324 of outer wheel half 202. In various embodiments, wheel 15A may comprise forged aluminum. Tire 332 may be located at least partially radially outward of wheel 15A. Wheel 15A may include one or more threaded portions such as a tire pressure indicator system (TPIS) plug port, over-inflation plug port, inflation valve port, and/or the like.

In various embodiments, wheel 15A may include one or more bored portions such as bearing bore 216 for example. Bearing bore 216 may house one or more outer races such as outer race 342. Outer race 342 may be pressed tightly into bearing bore 216. Outer race 342 may retain an inner race and rollers (or bearings). Outer race 342, along with the inner race and rollers may comprise a bearing assembly. In various embodiments, inner surface 322 of inner wheel half 200 may be compressed against mating surface 324 of outer wheel half 202.

In various embodiments, a plurality of nuts and bolts, such as bolt 328 and nut 325, may be used to couple inner wheel half 200 and outer wheel half 202. In various embodiments, a washer, such as washer 327, may be compressed between bolt 328 and inner wheel half 200. In various embodiments, a washer, such as washer 326, may be compressed between nut 325 and outer wheel half 202

Figure 4:
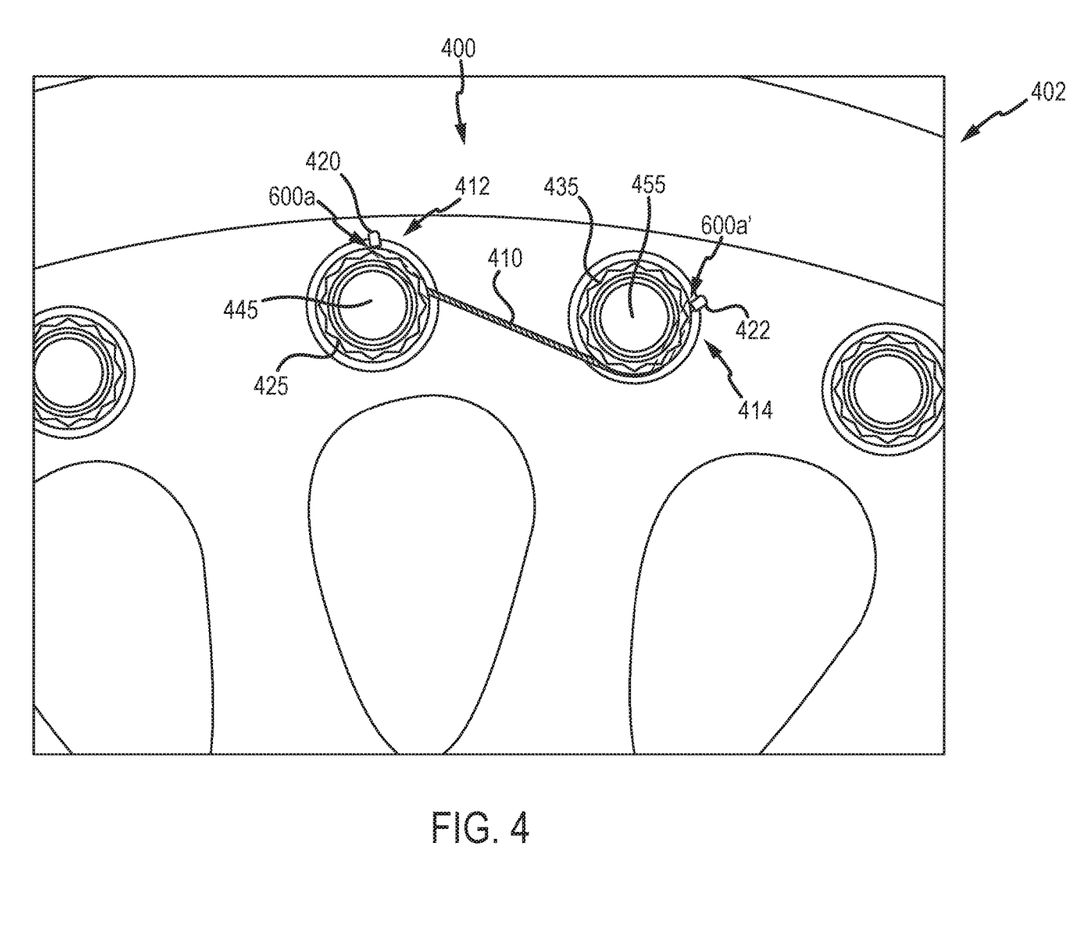
FIG. 4 illustrates a nut retention arrangement having a safety cable, in accordance with various embodiments.

With reference to FIG. 4, a portion of a wheel 402 with a nut retention arrangement 400 is illustrated, in accordance with various embodiments. In various embodiments, wheel 402 may be similar to wheel 15A, with momentary reference to FIG. 3. Nut retention arrangement 400 may include a tensile member (also referred to herein as a safety cable or a cable) 410. Cable 410 may be a metallic cable, such as a steel cable, for example. Nut retention arrangement 400 may include nut (also referred to herein as a first nut) 425 and nut (also referred to herein as a second nut) 435. In various embodiments, nut 425 may be similar to nut 325, with momentary reference to FIG. 3. In various embodiments, nut 435 may be similar to nut 325, with momentary reference to FIG. 3. In various embodiments, nut 425 and/or nut 435 may comprise a metal such as a carbon alloy, a nickel alloy, or any other suitable alloy. In various embodiments, nut 425 and/or nut 435 may comprise a high grade of steel capable of handling up to two hundred and twenty pounds-force per square inch (220 psi) or more.

Figure 6A:
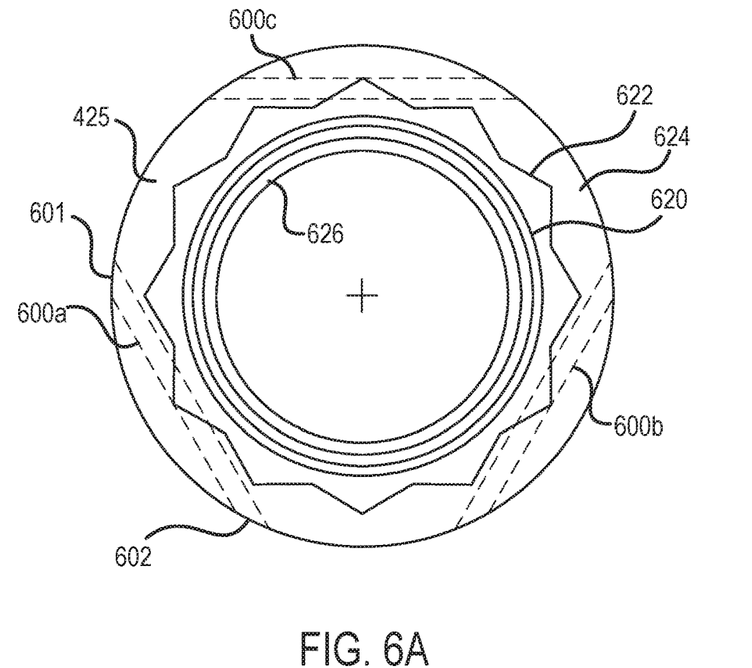
FIG. 6A illustrates a top view of a nut having a plurality of retention apertures, in accordance with various embodiments.
Figure 6B:
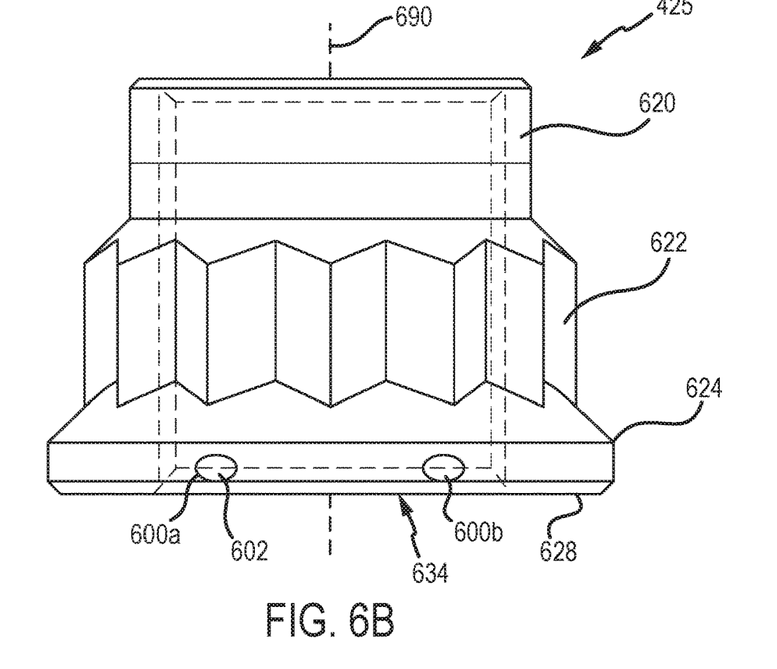
FIG. 6B illustrates a side view of the nut of FIG. 6A, in accordance with various embodiments.

With momentary reference to FIG. 6A and FIG. 6B, nut 425 may comprise an annular wall 620 defining a threaded aperture (also referred to herein as a first threaded aperture) 626. Annular wall 620 may extend along rotational axis 690. A torque feature 622 may extend outward from annular wall 620. In the embodiment illustrated in FIG. 6A, torque feature 622 comprises twelve triangular ridges vertically extending along annular wall 620. However any number of vertically extending ridges comprising any suitable shape may be circumferentially disposed around annular wall 620 suitable for providing a surface by which a torque may be applied to nut 425. In various embodiments, torque feature 622 may comprise a star geometry, a polygonal geometry, or any other suitable geometry. A flange 624 may be circumferentially disposed about annular wall 620. Flange 624 may extend radially outward from annular wall 620. Flange 624 may define a contacting surface 628 located at the base of nut 425. Contacting surface may be compressed against an adjacent surface, such as wheel 402 for example, in response to nut 425 being tightened, with momentary reference to FIG. 4. In this regard, flange 624 may define a terminus 634 of the nut 425.

Nut 425 may comprise one or more retention apertures. Nut 425 may comprise retention aperture (also referred to herein as a first retention aperture) 600a. Retention aperture 600a may be disposed in flange 624. Retention aperture 600a may be oriented perpendicular to rotational axis 690. Retention aperture 600a may extend through flange 624 without breaching threaded aperture 626. Stated differently, retention aperture 600a may extend through flange 624 without intersecting threaded aperture 626. In this manner, retention aperture 600a may extend through flange 624 without intersecting rotational axis 690. Retention aperture 600a may comprise a through-hole comprising a first opening 601 and a second opening 602. In various embodiments, first opening 601 may be similar to second opening 602. In various embodiments, retention aperture 600a may comprise a circular geometry. However, retention aperture 600a may comprise any suitable geometry, including rectangular, ellipsoidal, and/or polygonal. Nut 425 may comprise a plurality of retention apertures, including retention aperture 600*a*, retention aperture (also referred to herein as a second retention aperture) 600*b*, and retention aperture (also referred to herein as a third retention aperture) 600*c*. Retention aperture 600*b* and retention aperture 600*c* may be similar to retention aperture 600*a*. Retention aperture 600*a*, retention aperture 600*b*, and retention aperture 600*c* may be equally spaced around nut 425 in a common axial plane. Retention aperture 600*a*, retention aperture 600*b*, and retention aperture 600*c* may be circumferentially spaced about flange 624. Retention aperture 600*a* may be configured to accommodate a tensile member, such as safety wire and/or a safety cable, as described herein. In various embodiments, retention aperture 600*a* may be drilled into nut 425. In various embodiments, retention aperture 600*a* may be formed via additive and/or subtractive manufacturing processes. Nut 435 may be similar to nut 425, with momentary reference to FIG. 4.

In various embodiments, providing a plurality of retention apertures disposed in nut 425, as illustrated in FIG. 6A, may provide more openings to choose from when installing a tensile member into a retention aperture. In this regard, with reference to FIG. 6A, as nut 425 is rotated to an installed position, an opening (e.g., openings 601 and 602) is presented approximately every sixty degrees, in accordance with various embodiments. Stated differently, a plurality of retention apertures may help ensure that an opening is available at the correct position to prevent nut 425 from loosening.

With combined reference to FIG. 4 and FIG. 6A, cable 410 may extend between nut 425 and nut 435. A first end 412 of cable 410 may extend through retention aperture 600*a*. A ferrule (also referred to herein as a first ferrule) 420 may be coupled to the first end 412 of cable 410. Ferrule 420 may prevent cable 410 from translating through retention aperture 600*a* towards nut 435. A second end 414 of cable 410 may extend through retention aperture 600*a'*. A ferrule 422 may be coupled to second end 414 to prevent cable 410 from sliding through retention aperture 600*a'* towards nut 425.

During installation, nut 425 may be tightened over threaded fastener 445 and nut 435 may be tightened over threaded fastener 455 to a predetermined torque. Then, first end 412 may be placed through retention aperture 600*a* and ferrule 420 attached to the first end 412. Next, second end 414 may be placed through retention aperture 600*a'* and the cable 410 pulled tight to remove or reduce slack in cable 410. Then, ferrule 422 may be coupled to second end 414. In various embodiments, ferrule 422 may be crimped over second end 414. Cable 410 may be pretensioned. In this regard, cable 410 may prevent nut 425 from rotating relative to threaded fastener 445 in the opposite rotational direction from the rotational direction by which nut 425 was tightened over threaded fastener 445. Similarly, cable 410 may prevent nut 435 from rotating relative to threaded fastener 455. In various embodiments, rotation in a direction toward loosening of either nut 425 or nut 435 may cause rotation in a direction toward tightening of the other of nut 425 or nut 435. For example, cable 410 may be configured to cause rotation of nut 425 in the clockwise direction in response to nut 435 rotating in the counter-clockwise direction, as illustrated in FIG. 4. In various embodiments, threaded fastener 445 may be similar to bolt 328, with momentary reference to FIG. 3.

Figure 5:
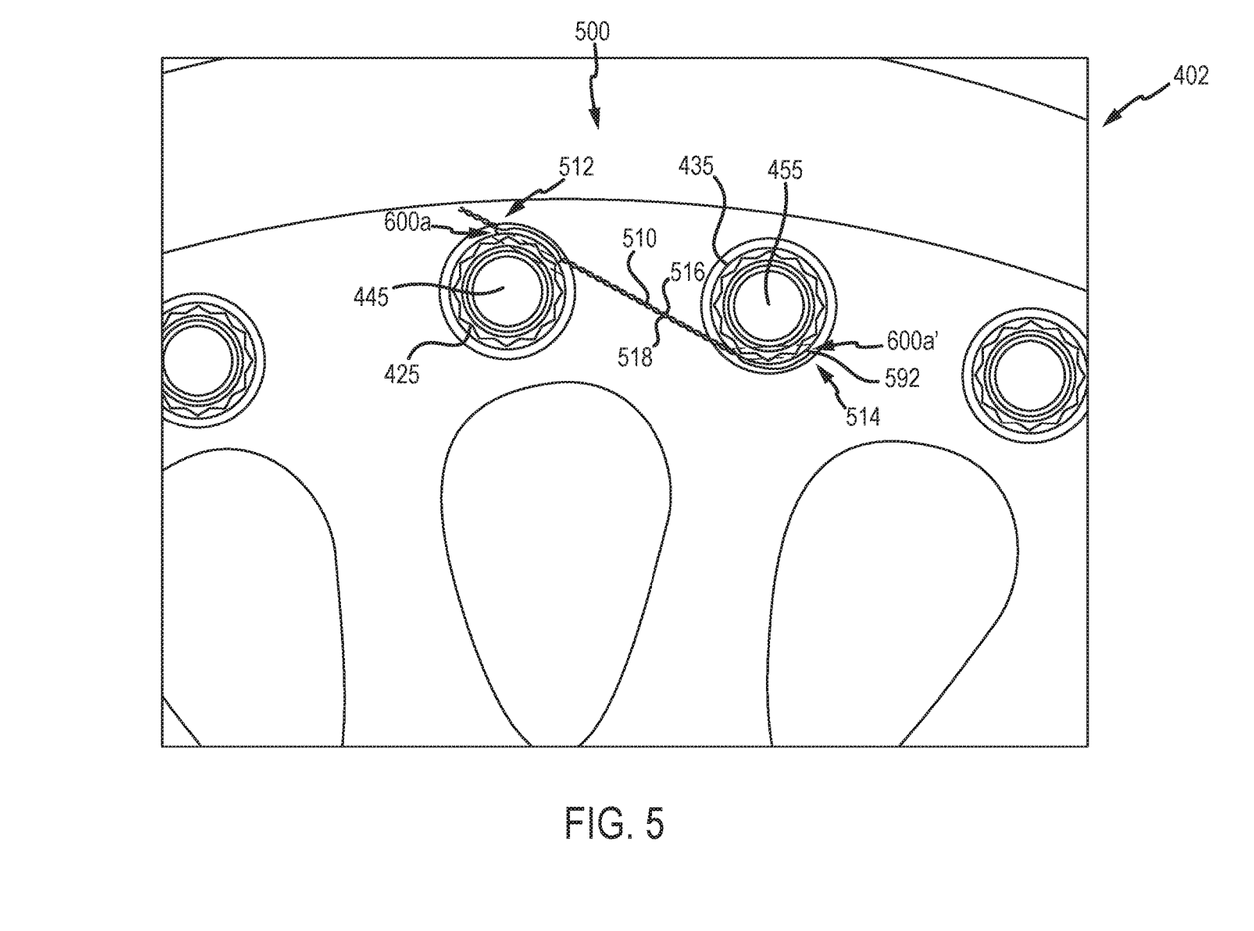
FIG. 5 illustrates a nut retention arrangement having a safety wire, in accordance with various embodiments.

With reference to FIG. 5, a portion of a wheel 402 with a nut retention arrangement 500 is illustrated, in accordance with various embodiments. Nut retention arrangement 500 may include a tensile member (also referred to herein as a safety wire or a wire) 510. Wire 510 may be a metallic wire, such as a steel wire, for example. Nut retention arrangement 500 may include nut 425 and nut 435. Wire 510 may comprise a first strand 516 twisted together to a second strand 518. First strand 516 and second strand 518 may be coupled together at second end 514 of wire 510. In this regard, first strand 516 and second strand 518 may comprise a single wire terminated at second end 514 via a bend 592. In this regard, second end 514 of the wire 510 may terminate with the first strand 516 coupled to the second strand 518 at bend 592. However, it is contemplated herein that wire 510 may comprise two separate strands, in accordance with various embodiments.

During installation, nut 425 may be tightened over threaded fastener 445 and nut 435 may be tightened over threaded fastener 455 to a predetermined torque. Then, prior to being twisted, wire 510 may be placed through retention aperture 600*a'* and bent at second end 514. Then wire 510 may be twisted until the twists reach nut 425. At this point, one of the first strand 516 or second strand 518 may be placed through retention aperture 600*a*, with the other strand placed outside of retention aperture 600*a*. The two strands may be rejoined and twisted at the opposite end of retention aperture 600*a* from where the wire strand was inserted into retention aperture 600*a*. Any excess wire may be trimmed from first end 512. Wire 510 may be pretensioned before or during the twisting of the strands of first end 512. In this regard, wire 510 may prevent nut 425 from rotating relative to threaded fastener 445 in the opposite rotational direction from the rotational direction by which nut 425 was tightened over threaded fastener 445. Similarly, wire 510 may prevent nut 435 from rotating relative to threaded fastener 455. In various embodiments, rotation in a direction toward loosening of either nut 425 or nut 435 may cause rotation in a direction toward tightening of the other of nut 425 or nut 435. For example, wire 510 may be configured to cause rotation of nut 425 in the clockwise direction in response to nut 435 rotating in the counter-clockwise direction, as illustrated in FIG. 5.

With combined reference to FIG. 4 and FIG. 5, nut retention arrangement 400 and nut retention arrangement 500 may provide a secondary system by which nuts for aircraft wheels may be prevented from loosening.

Figure 7:
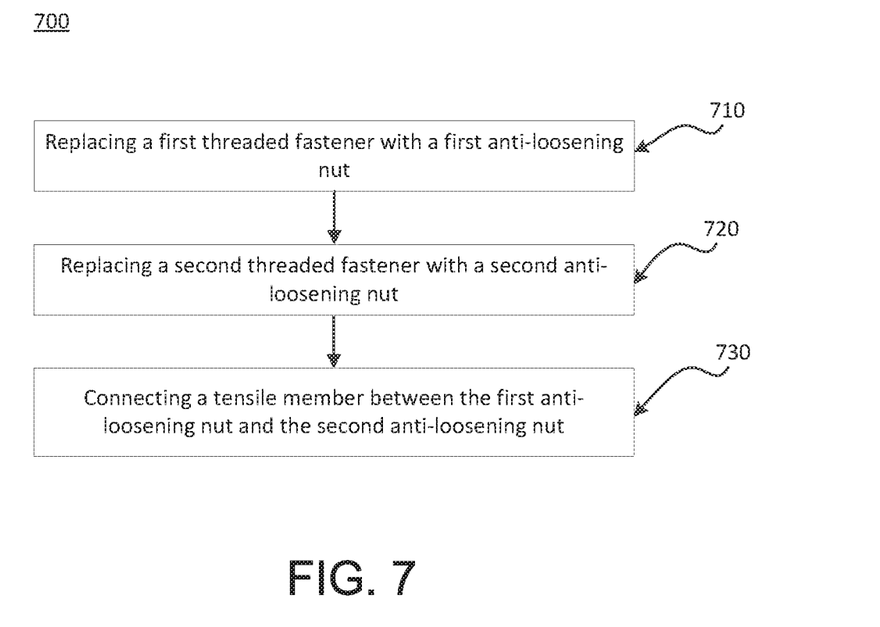
FIG. 7 illustrates a method of servicing an aircraft to prevent threaded fasteners from loosening, in accordance with various embodiments.

With reference to FIG. 7, a method 700 of servicing an aircraft to prevent threaded fasteners from loosening is provided, in accordance with various embodiments. Method 700 includes replacing a first threaded fastener with a first anti-loosening nut (step 710). Method 700 includes replacing a second threaded fastener with a second anti-loosening nut (step 720). Method 700 includes connecting a tensile member between the first anti-loosening nut and the second anti-loosening nut (step 730).

With combined reference to FIG. 4, FIG. 5, and FIG. 7, step 710 may include replacing a threaded fastener, such as a typical nut for example, with nut (also referred to herein as a first anti-loosening nut) 425. Step 720 may include replacing a threaded fastener, such as a typical nut for example, with nut (also referred to herein as a second anti-loosening nut) 435. Step 730 may include connecting a tensile member, such as cable 410 or wire 510 for example, between nut 425 and nut 435.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A nut retention arrangement comprising:
a first nut comprising:
a first annular wall defining a first threaded aperture extending along a rotational axis of the first nut, the first annular wall configured to engage a first threaded fastener via the first threaded aperture;
a first flange circumferentially disposed about the first annular wall; and
a first retention aperture disposed in the first flange, wherein the first retention aperture extends through the first flange without breaching the first threaded aperture;
a second nut comprising:
a second annular wall defining a second threaded aperture extending along a rotational axis of the second nut, the second annular wall configured to engage a second threaded fastener via the second threaded aperture;
a second flange circumferentially disposed about the second annular wall; and
a second retention aperture disposed in the second flange, wherein the second retention aperture extends through the second flange without breaching the second threaded aperture; and
a tensile member having a first end extending through the first retention aperture and a second end extending through the second retention aperture such that rotation in a direction toward loosening of either the first nut or the second nut causes rotation in a direction toward tightening of the other of the first nut or the second nut.

2. The nut retention arrangement of claim 1, further comprising:
a first threaded fastener; and
a second threaded fastener,
wherein the first nut is coupled to the first threaded fastener, the first threaded aperture engaging the first threaded fastener, and
the second nut is coupled to the second threaded fastener, the second threaded aperture engaging the second threaded fastener.

3. The nut retention arrangement of claim 2, wherein the tensile member prevents the first nut from rotating with respect to the first threaded fastener and prevents the second nut from rotating with respect to the second threaded fastener.

4. The nut retention arrangement of claim 1, further comprising:
a first ferrule coupled to the first end; and
a second ferrule coupled to the second end.

5. The nut retention arrangement of claim 4, wherein the first ferrule prevents the first end from translating through the first retention aperture.

6. The nut retention arrangement of claim 1, wherein the first retention aperture extends in a direction orthogonal to the rotational axis of the first nut.

7. The nut retention arrangement of claim 1, wherein the tensile member comprises:
a first strand twisted together with a second strand,
wherein the first strand extends through the first retention aperture, and
one of the first strand or the second strand extends through the second retention aperture.

8. The nut retention arrangement of claim 7, wherein the first end of the tensile member terminates with the first strand twisted together with the second strand.

9. The nut retention arrangement of claim 7, wherein the second end of the wire terminates with the first strand coupled to the second strand at a bend in the tensile member.

10. A method of servicing an aircraft to prevent threaded fasteners from loosening comprising:
replacing a first threaded fastener on an aircraft with a first anti-loosening nut, comprising:
a first annular wall defining a first threaded aperture extending along a rotational axis of the first nut, the first annular wall configured to engage a first threaded fastener via the first threaded aperture;
a first flange circumferentially disposed about the first annular wall; and
a first retention aperture disposed in the first flange, wherein the first retention aperture extends through the first flange without breaching the first threaded aperture;

replacing a second threaded fastener on the aircraft with a second anti-loosening nut, comprising:
- a second annular wall defining a second threaded aperture extending along a rotational axis of the second nut, the second annular wall configured to engage a second threaded fastener via the second threaded aperture;
- a second flange circumferentially disposed about the second annular wall; and
- a second retention aperture disposed in the second flange, wherein the second retention aperture extends through the second flange without breaching the second threaded aperture; and connecting a tensile member between the first anti-loosening nut and the second anti-loosening nut by extending a first end of the tensile member through the first retention aperture and a second end of the tensile member through the second retention aperture, such that rotation in a direction toward loosening of either the first anti-loosening nut or the second anti-loosening nut causes rotation in a direction toward tightening of the other of the first anti-loosening nut or the second anti-loosening nut.

11. The method of claim 10, wherein the tensile member comprises at least one of a wire or a cable.

12. A nut comprising:
- an annular wall defining a threaded aperture extending along a rotational axis of the nut, the annular wall configured to engage a threaded fastener via the threaded aperture;
- a flange circumferentially disposed about the annular wall; and
- a first retention aperture disposed in the flange, wherein the first retention aperture extends through the flange without breaching the threaded aperture.

13. The nut of claim 12, wherein the first retention aperture extends in a direction perpendicular to the rotational axis.

14. The nut of claim 13, wherein the first retention aperture is configured to receive a tensile member.

15. The nut of claim 14, further comprising:
- a second retention aperture disposed in the flange.

16. The nut of claim 15, wherein the first retention aperture and the second retention aperture are circumferentially spaced about the flange.

17. The nut of claim 15, wherein the flange extends from the annular wall at a terminus of the nut.

\* \* \* \* \*